United States Patent
Peyret

(10) Patent No.: US 12,337,842 B2
(45) Date of Patent: Jun. 24, 2025

(54) PATH-CONTROLLING MODULE, ASSOCIATED PATH-CONTROLLING DEVICE AND ASSOCIATED METHOD

(71) Applicant: RENAULT S.A.S, Boulogne-Billancourt (FR)

(72) Inventor: Maud Peyret, Paris (FR)

(73) Assignee: AMPERE S.A.S., Boulogne-Billancourt (FR)

( * ) Notice: Subject to any disclaimer, the term of this patent is extended or adjusted under 35 U.S.C. 154(b) by 240 days.

(21) Appl. No.: 17/998,557

(22) PCT Filed: May 5, 2021

(86) PCT No.: PCT/EP2021/061863
§ 371 (c)(1),
(2) Date: Nov. 11, 2022

(87) PCT Pub. No.: WO2021/228657
PCT Pub. Date: Nov. 18, 2021

(65) Prior Publication Data
US 2023/0211786 A1    Jul. 6, 2023

(30) Foreign Application Priority Data
May 12, 2020   (FR) .................................. 20 04668

(51) Int. Cl.
*B60W 30/18*     (2012.01)
*B60W 40/10*     (2012.01)

(52) U.S. Cl.
CPC ...... *B60W 30/18163* (2013.01); *B60W 40/10* (2013.01); *B60W 2520/10* (2013.01); *B60W 2520/12* (2013.01); *B60W 2552/53* (2020.02)

(58) Field of Classification Search
CPC ........... B60W 30/18163; B60W 40/10; B60W 2520/10; B60W 2520/12; B60W 2552/53
See application file for complete search history.

(56) References Cited

U.S. PATENT DOCUMENTS 10,427,676 B2 * 10/2019 Jafari Tafti ............ G08G 1/163
2017/0316684 A1 * 11/2017 Jammoussi .......... G08G 1/0112
(Continued)

FOREIGN PATENT DOCUMENTS

CN      110597245 A    12/2019

OTHER PUBLICATIONS

International Search Report issued Aug. 6, 2021 in PCT/EP2021/061863, filed on May 5, 2021, 2 pages.
(Continued)

*Primary Examiner* — Kira Nguyen
(74) *Attorney, Agent, or Firm* — Oblon, McClelland, Maier & Neustadt, L.L.P.

(57) ABSTRACT

A motor-vehicle path-controlling module is arranged to model the path of the vehicle during a change in traffic lane by a Bezier curve relating a value of a parameter to a value of a lateral deviation of the vehicle from the center of a traffic lane and to a value of a time-dependent variable representative of the variation in the change of path; determine a setpoint state vector of a closed feedback loop of a path-controlling device, the loop being designed to control the motor vehicle so that it follows the path modelled by the Bezier curve, the vector being determined on the basis of the lateral deviation, of the time-dependent variable and of the parameter, and transmit the setpoint state vector to the input of the loop.

10 Claims, 3 Drawing Sheets

(56) References Cited

U.S. PATENT DOCUMENTS

2017/0364083 A1* 12/2017 Yang .................... G05D 1/0223
2022/0126882 A1* 4/2022 Oh .................. B60W 30/18163
2022/0355862 A1* 11/2022 Kvieska ............... B62D 15/025

OTHER PUBLICATIONS

French Preliminary Search Report issued Feb. 4, 2021 in FR 20 04668, filed on May 12, 2020, 3 pages (with English Translation of Categories of Cited Documents).
Bae et al., "Lane Change Maneuver based on Bezier Curve providing Comfort Experience for Autonomous Vehicle Users", *2019 IEEE Intelligent Transportation Systems Conference (ITSC)*, IEEE, Oct. 27-30, 2019, DOI: 10.1109/ITSC.2019.8916845, XP033668181 pp. 2272-2277.
Korzeniowski et al., "Method of planning a reference trajectory of a single lane change manoeuver with Bezier curve", *IOP Conference Series: Materials Science and Engineering*, GB, vol. 148, Sep. 1, 2016 (Sep. 1, 2016), DOI: 10.1088/1757-899X/148/1/012012, ISSN: 1757-8981, XP055765061, 11 pages.

* cited by examiner

PATH-CONTROLLING MODULE, ASSOCIATED PATH-CONTROLLING DEVICE AND ASSOCIATED METHOD

The present invention relates to a device for controlling the path of a motor vehicle.

The present invention relates more particularly to a device for the real-time control of the path of a vehicle in order to control the path of the vehicle during a change in path, for example during a lane change, to a path-control module incorporated into the device and to a method for implementing such a device.

Motor vehicles may be fitted with path-control devices designed to assist the driver in keeping the vehicle in the lane in which it is driving, notably to keep the vehicle in the center of the lane. Such devices may also be found in autonomous vehicles where driving is entirely delegated to the vehicle. They act on the steering of the vehicle by modifying the steering angle of the steered wheels of the vehicle.

Such devices may also allow the vehicle to move from a first traffic lane to a second traffic lane semi-autonomously when the driver of the vehicle for example actuates a turn signal and alters the position of the steering wheel, or autonomously, the timing of the lane change being determined by the device.

FIG. 1 illustrates a real-time path-control device DISP applied to a motorized motor vehicle 1 comprising two steered wheels, preferably the front wheels of the vehicle, which are controlled by an actuator governed by a control signal u.

In what follows, the operator $\dot{x}$ indicates the derivative of x.

The steered front wheels of the vehicle 1 are controlled by an actuator governed by a control signal U.

The vehicle 1 further comprises a sensor intended to measure a parameter of the vehicle, such as the actual longitudinal velocity V, the steering lock angle $\delta$ made by the front wheels, the yaw velocity $\dot{\Psi}$ of the vehicle or the steering angle.

The vehicle may further be fitted with an apparatus of RaCam type that combines the properties of an optical camera and of a radar so as to be able to supply the model with a directrix of the vehicle traffic lane in the form of a polynomial y(x) or with an optical camera allowing the polynomial y(x) to be determined.

The vehicle 1 is equipped with an onboard computer comprising a controller device 2 for generating a control signal Ust so as to cause a physical state vector $\xi$ of the vehicle to correspond to a setpoint state vector $\xi^*$ to ensure that the vehicle 1 follows a desired path.

The onboard computer further comprises an observer 3 for the real-time generation of a path-following estimated state vector $\hat{\xi}$ for the vehicle 1 traveling at the velocity V on the basis of the control Ust and of a current measurement vector $\eta$ for state variables which is correlated with the path-following physical state vector $\xi$ for the vehicle 1.

The purpose of the observer device 3 is to generate, in real time, an estimated state vector $\hat{\xi}$ that represents as faithfully as possible the effective state vector $\xi$ and employs a vehicle model known by the name of bicycle model.

The onboard computer further comprises a predictor module 4 that adds a second steering lock command Uff as a function of a curvature yff of a bend to the first steering lock command Ust produced by the device 2 to compensate for the bend.

The second steering lock command Uff allows the vehicle 1 to negotiate the bend of curvature yff. The second command is added to the control signal Ust so that the controller device 2 regulates the path of the vehicle 1 so that the vehicle 1 follows a straight route.

Therefore the control signal U is equal to the sum of the first command Ust and of the second command Uff.

The device for the real-time control of the path of the vehicle 1 comprises the actuator, the speed sensor, the sensor for measuring a steering lock angle $\delta$, the sensor for measuring the yaw velocity $\dot{\Psi}$ and the apparatus of the RaCam type, the device 2, the observer 3 and the module 4.

The device 2, the observer 3 and the module 4 form a closed control loop Br having for setpoint the setpoint state vector $\xi^*$.

The physical state vector $\xi$ for the vehicle is equal to:

$$\xi = \begin{pmatrix} \dot{\Psi} \\ \Psi \\ \dot{yl} \\ yl \\ \dot{\delta} \\ \delta \\ \int -yl \end{pmatrix} \quad (1)$$

where $\Psi$ is the relative heading angle between the axis of the vehicle and the tangent to the reference path, $\dot{yl}$ is the lateral rate at which the vehicle is departing from the ideal vehicle path, yl is the lateral deviation between the center of gravity of the vehicle and the center of the vehicle lane and the tangent to the path ahead of the vehicle, $\dot{\delta}$ is the variation in steering lock angle and $\int -yl$ represents the integral of the lateral position.

The setpoint state vector $\xi^*$ is equal to:

$$\xi^* = \begin{pmatrix} \dot{\Psi}_{ref} \\ \Psi_{ref} \\ \dot{yl}_{ref} \\ yl_{ref} \\ \dot{\delta}_{ref} \\ \delta_{ref} \\ \int -yl_{ref} \end{pmatrix} \quad (2)$$

And the estimated state vector $\hat{\xi}$ is equal to:

$$\hat{\xi} = \begin{pmatrix} \dot{\Psi}_{est} \\ \Psi_{est} \\ \dot{yl}_{est} \\ yl_{est} \\ \dot{\delta}_{est} \\ \delta_{est} \\ \int -yl_{est} \end{pmatrix} \quad (3)$$

The vector $\xi$ is partially unknown because the internal state of the vehicle 1 is not accessible in its entirety.

The observer 3 estimates the lateral speed at which the vehicle is departing from the ideal vehicle path $\dot{yl}$, and the variation in steering lock angle $\dot{\delta}$, the five state variables being measured.

The current measurements vector η has five components:

$$\eta = \begin{pmatrix} \Psi \\ \dot{\Psi} \\ yl \\ \delta \\ \int -yl \end{pmatrix} \quad (4)$$

The yaw velocity $\dot{\Psi}$ is measured by the yaw velocity sensor.

During a lane change, the setpoint state vector ξ* is modified so that the device DISP steers the vehicle 1 so that it moves sideways to the center of a traffic lane adjacent to the lane in which the vehicle is moving in a way that is comfortable for the passengers of the vehicle.

The path of the vehicle during the lane change is notably defined by a limiting of the lateral acceleration of the vehicle 1 and of the lateral velocity of the vehicle 1.

Reference may be made to document US20180348767 which discloses a lane-change device.

The path during the lane change is dependent on the vehicle velocity profile, the determining of the path employing an optimum calculation requiring a great deal of processing power.

In addition, if the path determined is not compatible with the vehicle surroundings, the optimum calculation is repeated.

Reference may also be made to the document entitled "Méthode de planification d'une trajectoire de référence avec une courbe de Bézier lors d'une manoeuvre de changement de voie [Method for planning a reference path with a Bézier curve during a lane change maneuver]" by D. Korzeniowski and G Ślaski which proposes a lane-change method employing two symmetrical Bézier curves defining a path for changing lane to the two adjacent traffic lanes situated one on each side of the vehicle.

Because the two curves are symmetrical and linked to one another, it is necessary to ensure continuity between the two curves.

In addition, it is necessary to calculate several paths on the basis of the Bézier curves in order to determine the optimal lane-change path.

The method proposed requires a great deal of processing power to ensure the continuity of the Bézier curves and to determine the optimum lane-change path.

Document WO2019/059829 discloses a method for determining a lane-change path employing a combination of two paths, a first path dictated by the driver of the vehicle and a second path determined by a lane-change system.

However, that method requires the intervention of the driver.

Document U.S. Pat. No. 9,796,421 discloses a lateral control device for a motor vehicle but does not disclose a lane-change method.

The proposal therefore is to alleviate all or some of the disadvantages of the lane-change devices according to the prior art, notably by offering a path-control device that autonomously determines the path to be followed when changing lane while taking into consideration the environment in which the vehicle is moving, that does not require a great deal of processing power and that is easily implementable.

In the light of the foregoing, the invention proposes a path-control method for a motor vehicle, the method comprising:

modeling the path of the vehicle during a lane change using a Bézier curve linking a value of a parameter to a value of a lateral deviation of the vehicle with respect to the center of a lane and to a value of a time-dependent variable representative of the variation in the change in path;

determining a setpoint state vector of a path-control device on the basis of the lateral deviation, of the time-dependent variable and of the parameter, and steering the vehicle using the path-control device on the basis of the state variable so that the vehicle follows the modeled path.

According to one feature, the determining of the setpoint state vector comprises:

a) determining a value of the parameter so that each increment of a time counter of the path-control device is comprised between two consecutive time-dependent variables;

b) determining two consecutive lateral deviations on the basis of the value of the parameter;

c) determining an intermediate lateral deviation by interpolating between the two consecutive lateral deviations; and d) determining setpoint values comprising a setpoint lateral deviation, a setpoint yaw velocity, a setpoint heading angle, and a setpoint lateral velocity, the setpoint values being determined on the basis of the intermediate lateral deviation, of the two consecutive time-dependent variables and of the two consecutive lateral deviations;

the setpoint state vector comprising the setpoint lateral deviation and the setpoint values.

As a preference, the method further comprises determining a corrective radius of curvature on the basis of the two consecutive time-dependent variables, of the two consecutive lateral deviations and of the longitudinal velocity of the vehicle, and transmitting the corrective radius of curvature to the path-control device.

Advantageously, when the change in path is triggered, the time counter is started, and when the value reached by the counter is greater than or equal to the value of the time-dependent variable associated with the control point of the Bézier curve comprising the time-dependent variable of greatest value, the counter is stopped to indicate the end of the change in path.

As a preference, the method comprises repeated iterations of steps a), b), c), d) and possible repeated iterations of the determining of the corrective radius of curvature for each increment of the counter, two consecutive increments being separated by a constant duration.

Another subject of the invention is a path-control module for a motor vehicle, the module being configured to:

model the path of the vehicle during a lane change using a Bézier curve linking a value of a parameter to a value of a lateral deviation of the vehicle with respect to the center of a lane and to a value of a time-dependent variable representative of the variation in the change in path;

determine a setpoint state vector of a closed control loop of a path-control device, the loop being configured to steer the motor vehicle so that it follows the path modeled by the Bézier curve, the vector being determined on the basis of the lateral deviation, of the time-dependent variable and of the parameter, and transmit the setpoint state vector as input to the loop.

According to one feature, the module is configured to:

e) determine a value of the parameter so that each increment instant of a time counter of the path-control device is comprised between two consecutive time-dependent variables;

f) determine two consecutive lateral deviations on the basis of the value of the parameter;

g) determine an intermediate lateral deviation by interpolating between the two consecutive lateral deviations; and h) determine setpoint values comprising a setpoint lateral deviation, a setpoint yaw velocity, a setpoint heading angle, and a setpoint lateral velocity, the setpoint values being determined on the basis of the intermediate lateral deviation, of the two consecutive time-dependent variables and of the two consecutive lateral deviations;

the setpoint state vector comprising the setpoint lateral deviation and the setpoint values.

Advantageously, the module is further configured to determine a corrective radius of curvature on the basis of the two consecutive time-dependent variables, of the two consecutive lateral deviations and of the longitudinal velocity of the vehicle, and transmitting the corrective radius of curvature to the path-control device.

As a preference, the module is configured to start the time counter when a change in path is triggered and to stop the counter to indicate the end of the change in path when the value reached by the counter is greater than or equal to the value of the time-dependent variable associated with the control point of the Bézier curve comprising the time-dependent variable of greatest value.

In yet another aspect, the invention also relates to a path-control device comprising a path-control module as defined hereinabove, and a closed control loop configured to receive as setpoint the setpoint state vector determined by the path-control module, the control loop being further configured to steer the motor vehicle so that it follows the path modeled by the Bézier curve.

Further objects, features and advantages of the invention will become apparent from reading the following description, given solely by way of nonlimiting example, and made with reference to the attached drawings in which:

FIG. 1 which has already been mentioned, schematically illustrates a device for the real-time control of the path of a vehicle according to the prior art;

FIG. 2 schematically illustrates one embodiment of a vehicle path-control device according to the invention;

FIG. 3 and

Figure 1:
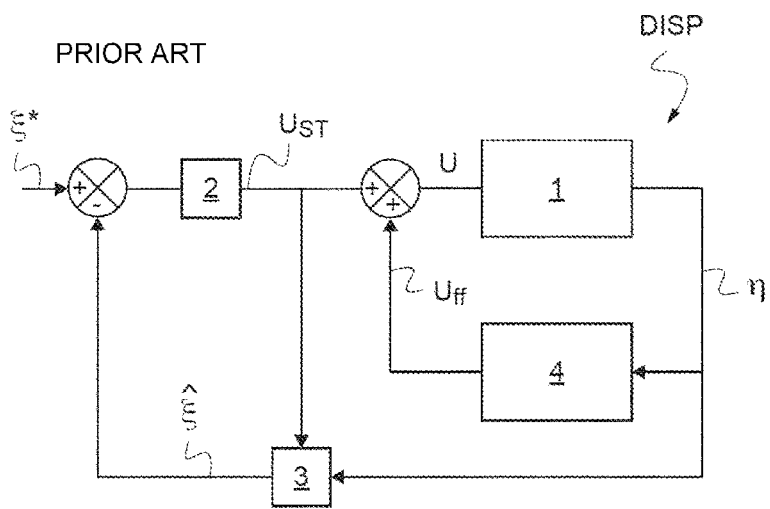
Figure 2:
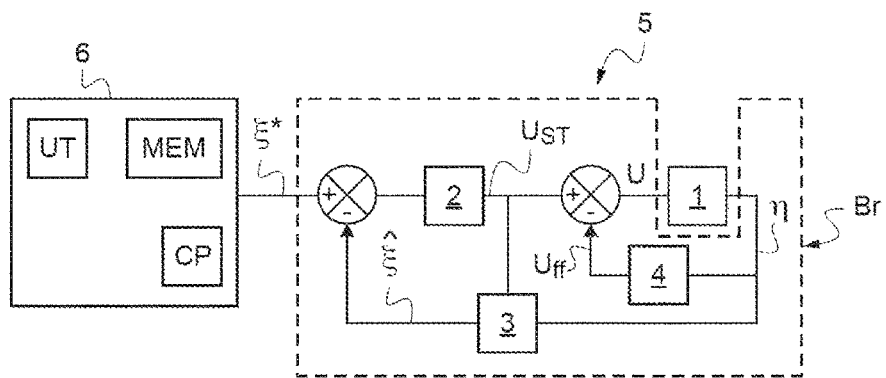

One embodiment of a path-control device 5 for the vehicle 1 according to one aspect of the invention has been schematically depicted in FIG. 2. Those elements of the device 5 that are identical to the elements that make up the device DISP of FIG. 1 bear the same references.

Once again, there are the closed control loop Br comprising the controller device 2 for generating the control signal Ust, the observer 3 for the real-time generation of the estimated state vector $\hat{\xi}$ for the following of a straight lane by the vehicle on the basis of the current measurements vector $\eta$ and the predictor module 4 for generating the second steering lock command Uff.

The command Ust is equal to the value of an angle $\delta_{rect}$ for the following of a straight rectilinear path.

The device 5 further comprises a path-control module 6 generating the setpoint state vector during a lane change.

The control module 6 models the path of the vehicle 1 during a lane change using a Bézier curve P linking a value of a parameter S to a value of the lateral deviation yl of the vehicle with respect to the center of the vehicle's current lane and to a value of a time-dependent variable x representative of the variation in change of path. The control module 6 determines the setpoint state vector $\xi^*$ on the basis of the lateral deviation yl, of the time-dependent variable x and of the parameter S, and transmits the setpoint state vector $\xi^*$ as input to the control loop Br.

Figure 3:
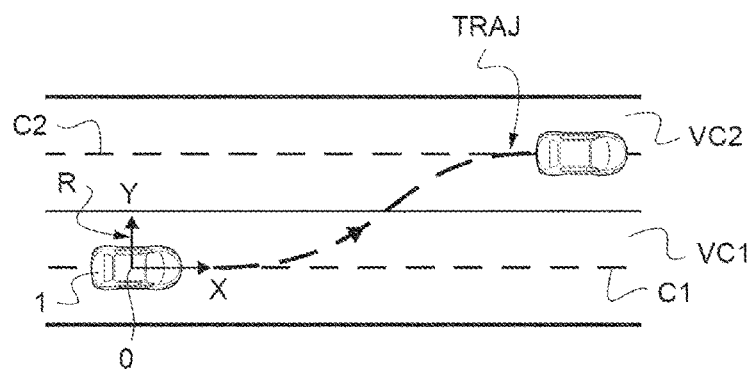
Figure 4:
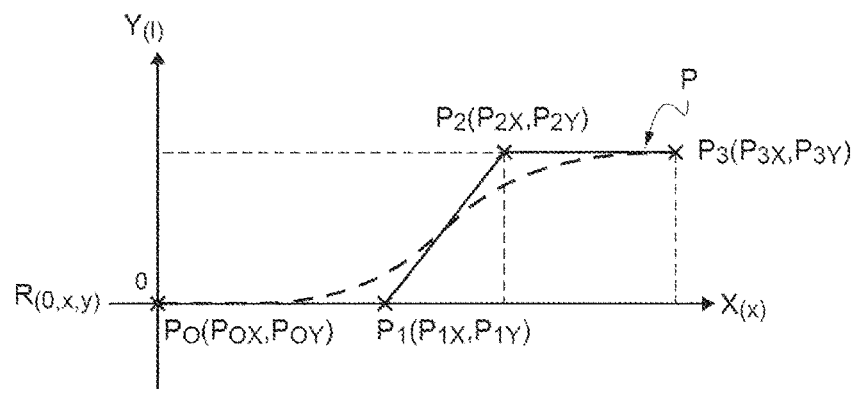
FIG. 4 illustrate an example of the modeling of a path of the vehicle 1 according to the invention.

FIGS. 3 and 4 illustrate an example of the modeling by the module 6 of a path of the vehicle 1 driving at the center C1 of a first traffic lane VC1 and moving sideways to the center C2 of a second traffic lane VC2 adjacent to the first lane VC1.

Although in this example the vehicle 1 moves sideways to its left in the direction of forward travel, the vehicle 1 may, as an alternative, move sideways to its right.

The curve TRAJ represents the path of the vehicle 1 to move from the first traffic lane VC1 to the second lane VC2.

R(O, X, Y) denotes a frame of reference linked to the lane VC1 with origin O on the center C1 of the lane VC1 before the vehicle 1 begins to move sideways, X is oriented in the direction of travel of the vehicle 1 and Y is positioned so that the frame of reference R is orthogonal.

The path of the vehicle 1 is determined in a straight line, the predictor module 4 determining the second steering lock command Uff on the basis of the curvature yff of the road, of the velocity V of the vehicle and of the characteristics of the vehicle 1, notably the mass of the vehicle and the stiffness of the tires.

More particular reference is made to FIG. 4 which illustrates an example of the modeling of the path TRAJ using a Bézier curve P in the frame of reference R(O, X, Y).

The Bézier curve P comprises four control points $P_0$, $P_1$, $P_2$ and $P_3$ with respective coordinates ($P_{ox}$; $P_{oy}$), ($P_{1x}$; $P_{1y}$)/ ($P_{2x}$; $P_{ty}$) and ($P_{3x}$; $P_{3y}$) and has the equation:

$$P(s)=P_0(1-s)^3+3P_1 s(1-s)^2+3P_2 s^2(1-s)+P_3 s^3 \quad (5)$$

where S varies between 0 and 1.

It is assumed that the abscissa axis X represents the time-dependent variable x representative of the variation in the change in path with respect to time, and the ordinate axis Y represents the lateral position yl of the vehicle 1 with respect to the frame of reference R(O, X, Y) of the lane VC1.

The vehicle 1 moves between the center C1 of the first lane VC1 corresponding to an initial lateral position $yl_{ini}$ defined by the coordinates of the control point $P_0$ located on the center C1 and a final position $yl_{fin}$ defined by the coordinates of the control point $P_3$ positioned on the center C2.

This yields the following equation:

$$\begin{pmatrix} x \\ yl \end{pmatrix} = \begin{pmatrix} P_{0x} \\ P_{0y} \end{pmatrix}(1-s)^3 + 3\begin{pmatrix} p_{1x} \\ P_{1y} \end{pmatrix}s(1-s)^2 + 3\begin{pmatrix} P_{2x} \\ P_{2y} \end{pmatrix}s^2(1-s) + \begin{pmatrix} f_{3x} \\ P_{3y} \end{pmatrix}s^3 \quad (6)$$

As a variant, the Bézier curve may comprise more than four control points in order to improve the precision with which the path TRAJ is modeled, although this then does increase the computational workload.

It is assumed in what follows that the path TRAJ of the vehicle moving sideways to the left and the path of the vehicle moving sideways to the right (not depicted) are symmetrical.

Therefore the coordinates of the control points $P_0$, $P_1$, $P_2$ and $P_3$ are chosen so that:

$$P_{0x} = 0 \quad (7)$$

$$P_{3x} - P_{2x} = P_{1x} \quad (8)$$

$$P_{0y} = yl_{ini} \quad (9)$$

$$P_{3y} = yl_{fin} \quad (10)$$

In addition the following definitions are imposed:

$$P_{1y} = P_{0y} \quad (11)$$

$$P_{2y} = P_{3y} \quad (12)$$

By differentiating the Bézier curve P the maximum lateral velocity $V_{lat,max}$ and the maximum lateral acceleration $a_{lat,max}$ are defined:

$$V_{lat,max} = \frac{|P_{3y} - P_{0y}|}{P_{2x}} \quad (13)$$

$$a_{lat,max} = 2\frac{|P_{3y} - P_{0y}|}{3P_{1x}^2} \quad (14)$$

The defining of a maximum value for the lateral velocity $V_{lat,max}$ and of a maximum value for the lateral acceleration $a_{lat,max}$ enables the coordinates $P_{1x}$, $P_{2x}$ and $P_{3x}$ to be determined.

The maximum value for the lateral velocity and the maximum value for the lateral acceleration are determined for example empirically during optimization of the path-control device.

The maximum value for the lateral velocity is for example equal to 0.8 m/s and the maximum value for lateral acceleration is for example equal to 0.5 m/s$^2$.

In general, the maximum value for maximum lateral acceleration $a_{lat,max}$ and the maximum value for lateral velocity $V_{lat,max}$ are chosen so that the lane-change path is comfortable for the passengers of the vehicle 1.

In order to reduce the maximum value for maximum lateral acceleration $a_{lat,max}$ when the vehicle 1 is engaging the second traffic lane VC2, all that is required is to increase the value of the coordinate $P_{3x}$.

By discretizing equation (6) by introducing the variable i that varies from 0 to N, for each instant $x_i$, equation (6) is equal to:

$$\binom{x_i}{yl_i} = \binom{P_{0x}}{P_{0y}}(1-s_i)^3 + 3\binom{P_{1x}}{P_{1y}}s_i(1-s_i)^2 + 3\binom{P_{2x}}{P_{2y}}s_i^2(1-s_i) + \binom{p_{3x}}{p_{3y}}s_i^3 \quad (15)$$

The module 6 comprises a processing unit UT employing equation (16).

The parameter S comprises all of the values $S_i$, where i varies from 1 to N, N being a whole number.

The number N is chosen to be large enough to obtain a path for the vehicle 1 from the curve P that is not excessively discretized so as not to slow the control loop Br and detract from passenger comfort, and so that the number is not excessively high, so as to minimize the computation workload of the processing unit UT.

N is for example equal to 50, the curve P being discretized into 50 points.

Naturally the value of N may be other than 50.

The value of N may be chosen so as not to discretize the path excessively, the value of N being for example greater than 30.

Furthermore, the value of N can be chosen so as not to overload the processing unit UT, the value of N being for example less than 100.

The module 6 further comprises a time counter CP, the module 6 triggering the counter CP upon the lane change and stopping the counter when the value reached by the counter is greater than or equal to the value of the time-dependent variable x associated with the control point on the Bézier curve $P_3$ that comprises the greatest value for the time-dependent variable $P_{3x}$.

The counter CP operates with a period Tc.

The period Tc is chosen according to the operating frequency of the module 6 and of the loop Br.

The period Tc is for example equal to 10 ms.

The stopping of the counter CP indicates the end of the lane change.

A change in path is detected for example when a torque applied to the steering column of the vehicle 1 is above a detection threshold and an electrical impulse notably emitted by a steering change device is detected.

If the vehicle 1 is not completely aligned on the center C1 of the second lane VC2 at the end of the change in path, the control loop Br aligns the vehicle 1 with the center C1 later.

Figure 5:
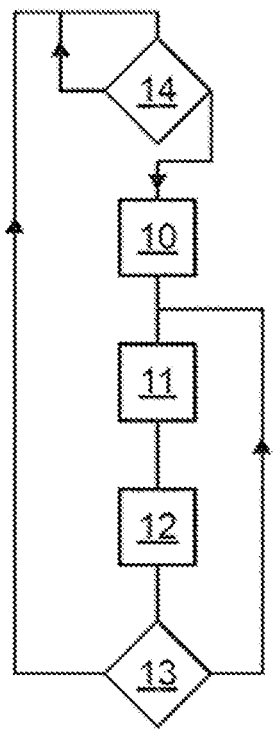
FIG. 5 illustrates one implementation of the vehicle path-control device according to the invention.

FIG. 5 illustrates an exemplary embodiment of the path-control device 5 during the lane change.

It is assumed that equation (15) and the control points $P_0$, $P_1$, $P_2$ and $P_3$ are stored in a memory MEM of the module 6.

The lane change is initiated in a step 10.

Next, in a step 11, the module 6 triggers the counter CP.

For each increment Tc of the counter, the module 6 determines the setpoint state vector on the basis of the lateral deviation $yl_i$, of the time-dependent variable $x_i$ and of the parameter $S_i$.

The setpoint state vector ξ* comprises setpoint values comprising for example the setpoint yaw velocity $\dot{\Psi}_{ref}$, a setpoint heading angle $\Psi_{ref}$ and a setpoint lateral velocity $\dot{yl}_{ref}$, the setpoint lateral deviation $yl_{ref}$.

The setpoint steering lock angle δref, the variation in steering lock angle δ̇ref and the integral of the setpoint lateral position ∫−ylref are equal to zero.

In a variant, the setpoint steering lock angle δref, the variation in steering lock angle δ̇ref and the integral of the lateral position ∫−ylref may be calculated on the basis of the lateral deviation yli.

Two consecutive increments are separated by the duration Tc.

The module 6 determines a value for the parameter $S_i$ such that each increment Tc of the time counter Cp is comprised between two consecutive time-dependent variables $x_i$ and $x_{i+1}$.

The module 6 then determines the two consecutive lateral deviations $yl_i$ and $yl_{i+1}$ from the value of the parameter $S_i$.

The module 6 determines an intermediate lateral deviation $yl_1$ by interpolating between the two consecutive lateral deviations $yl_i$ and $yl_{i+1}$.

The module 6 then determines setpoint values according to the following equations:

$$\dot{y}l_{ref} = \frac{y_{i+1} - y_i}{x_{i+1} - x_i} \quad (16)$$

$$\dot{\Psi}_{ref} = \frac{a_{lat}}{V} \quad (17)$$

where V is the longitudinal velocity of the vehicle 1 and $a_{lat}$ is the instantaneous lateral acceleration on the path equal to:

$$a_{lat} = \frac{y_{i+2} - 2y_{i+1} + y_i}{x_{i+1} - x_i} \quad (18)$$

and $$\Psi_{ref} = \frac{\dot{y}l_{ref}}{V} \quad (19)$$

The setpoint lateral deviation $yl_{ref}$ is equal to:

$$\begin{cases} yl_{ref} = yl1 & \text{when the vehicle is traveling in the first traffic lane } VC1 \\ yl_{ref} = yl1 - yl_{fin} & \text{when the vehicle is traveling in the second traffic lane } VC2 \end{cases} \quad (20)$$

In an optional step 12, the module 6 can determine a corrective radius of curvature $\rho_{SALC}$ on the basis of the instantaneous lateral acceleration $a_{lat}$, the lateral velocity $\dot{y}l$ and of the longitudinal velocity V of the vehicle, using the following equation:

$$\rho_{SLAC} = \frac{Va_{lat} - \dot{y}_l a_{lat}}{(V^2 + \dot{y}_l^2)^{\frac{3}{2}}} \quad (21)$$

The value of the corrective radius of curvature $\rho_{SALC}$ is transmitted to the predictor module 4 and added to the second command Uff to improve the dynamics of the path following.

Steps 11 and 12 are repeated until such time as the value reached by the counter CP is greater than or equal to the value $P_{3x}$ of the control point $P_3$ (step 13) for each increment of the counter CP.

As soon as the value of the counter CP becomes greater than or equal to the value $P_{3x}$, the next step becomes step 14 of waiting for the next lane change.

Depending on the data received, notably by the camera, the module 6 may modify the coordinates $P_{2y}$ and $P_{3y}$ in order to take into account dynamically the change in the width of the second lane VC2 so that the curve P can be recalculated so as to fit the path of the vehicle 1 to its environment at the time of the lane change.

Figure 6:
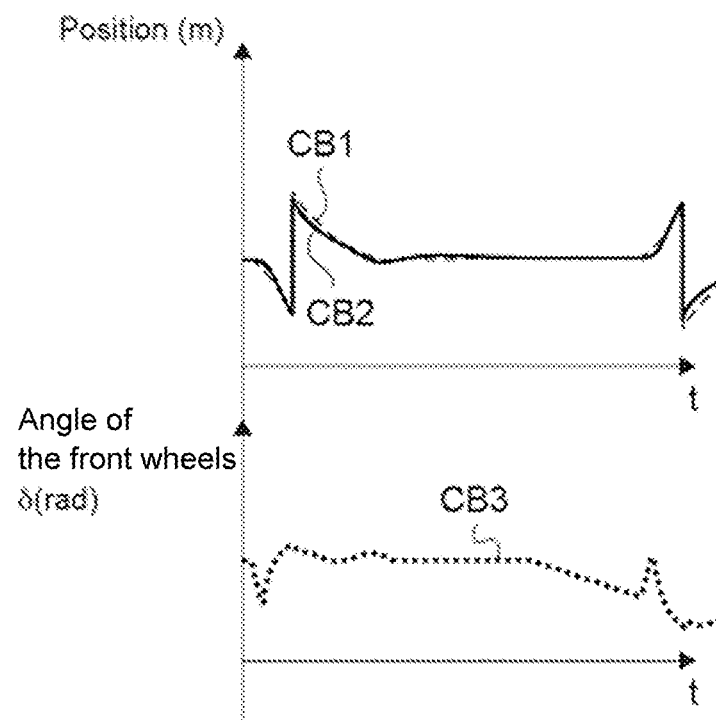
FIG. 6 depicts the variation with respect to time of the setpoint lateral deviation, of the lateral deviation and of the angle of the wheels following action of the control device according to the invention.

FIG. 6 depicts the variation with respect to time in the setpoint lateral position $yl_{ref}$ (curve CB1), in the lateral position yl of the vehicle 1 (curve CB2) and in the angle of the front wheels δ (curve CB3) upon a lane change to the right and then to the left by the vehicle 1 driving at a velocity V of 90 km/h.

Modeling the lane-change path using the Bézier curve P enables the geometric properties of the curve P to be easily adapted to take account of the environment in which the vehicle 1 is moving, notably the width of the lane to which the vehicle has moved.

In addition, calculating the setpoint state vector for the change in path and altering the geometric properties of the curve P to suit do not require significant computation power.

The initial determination of the geometric properties of the curve P requires only that the maximum lateral velocity and the maximum lateral acceleration of the vehicle and the duration of the lane-change operation be set ahead of time.

Furthermore, if the lane changes to the right or to the left of the vehicle are symmetrical in their path (same lateral acceleration at the start and the end of the paths) only the lateral velocity and the lateral acceleration need to be determined.

The parameters for adjustment, which for example comprise the lateral acceleration, the lateral velocity, the duration of the lane-change operation, may be determined on the basis of regulatory constraints and in such a way as to ensure the comfort of the passengers of the vehicle during the change in path.

Finally, the lane-change path can easily be adapted to the control loop Br that already exists on most vehicles, enabling existing control laws to be reused.

The invention claimed is:

1. A path-control method for a vehicle, comprising:
    modeling a path of the vehicle during a lane change using a Bézier curve linking a value of a parameter to a value of a lateral deviation of the vehicle with respect to a center of a lane on an ordinate axis and to a value of a time-dependent variable representative of a variation in a change in the path on an abscissa axis;
    determining a setpoint state vector of a path-control device based on the lateral deviation, the time-dependent variable and the parameter; and
    steering the vehicle using the path-control device based on a state variable so that the vehicle follows the modeled path.

2. The method as claimed in claim 1, wherein the determining of the setpoint state vector comprises:
    a) determining a value of the parameter so that each increment of a time counter of the path-control device is comprised between two consecutive time-dependent variables;
    b) determining two consecutive lateral deviations based on the value of the parameter;
    c) determining an intermediate lateral deviation by interpolating between the two consecutive lateral deviations; and
    d) determining setpoint values comprising a setpoint lateral deviation, a setpoint yaw velocity, a setpoint heading angle, and a setpoint lateral velocity, the setpoint values being determined based on the intermediate lateral deviation, of the two consecutive time-dependent variables and of the two consecutive lateral deviations,
    wherein the setpoint state vector comprises the setpoint lateral deviation and the setpoint values.

3. The method as claimed in claim 2, further comprising determining a corrective radius of curvature based on the two consecutive time-dependent variables, the two consecutive lateral deviations and a longitudinal velocity of the vehicle, and transmitting the corrective radius of curvature to the path-control device.

4. The method as claimed in claim 3, wherein when the change in the path is triggered, the time counter is started, and when the value reached by the counter is greater than or equal to the value of a time-dependent variable associated with a control point of the Bézier curve comprising a time-dependent variable of greatest value, the counter is stopped to indicate an end of the change in the path.

5. The method as claimed in claim 4, further comprising repeating iterations of a), b), c), d) and repeating iterations of the determining of the corrective radius of curvature for each increment of the counter, two consecutive increments being separated by a constant duration.

6. A path-control module for a vehicle, the module comprising:
   processing circuitry configured to:
   model a path of the vehicle during a lane change using a Bézier curve linking a value of a parameter to a value of a lateral deviation of the vehicle with respect to a center of a lane on an ordinate axis and to a value of a time-dependent variable representative of a variation in a change in the path on an abscissa axis,
   determine a setpoint state vector of a closed control loop of a path-control device, the closed control loop being configured to steer the vehicle so that the vehicle follows the path modeled by the Bézier curve, the vector being determined based on the lateral deviation, the time-dependent variable and the parameter, and
   transmit the setpoint state vector as input to the closed control loop.

7. The module as claimed in claim 6, wherein the processing circuitry is configured to:
   e) determine a value of the parameter so that each increment instant of a time counter of the path-control device is comprised between two consecutive time-dependent variables;
   f) determine two consecutive lateral deviations based on the value of the parameter;
   g) determine an intermediate lateral deviation by interpolating between the two consecutive lateral deviations; and
   h) determine setpoint values comprising a setpoint lateral deviation, a setpoint yaw velocity, a setpoint heading angle, and a setpoint lateral velocity, the setpoint values being determined based on the intermediate lateral deviation, of the two consecutive time-dependent variables and of the two consecutive lateral deviations,
   wherein the setpoint state vector comprises the setpoint lateral deviation and the setpoint values.

8. The module as claimed in claim 7, wherein the processing circuitry is configured to determine a corrective radius of curvature based on the two consecutive time-dependent variables, the two consecutive lateral deviations and a longitudinal velocity of the vehicle, and to transmit the corrective radius of curvature to the path-control device.

9. The module as claimed in claim 8, wherein the processing circuitry is configured to start the time counter when a change in path is triggered and to stop the counter to indicate an end of the change in path when the value reached by the counter is greater than or equal to the value of a time-dependent variable associated with a control point of the Bézier curve comprising a time-dependent variable of greatest value.

10. A path-control device comprising:
    processing circuitry configured to
    model a path of a vehicle during a lane change using a Bézier curve linking a value of a parameter to a value of a lateral deviation of the vehicle with respect to a center of a lane on an ordinate axis and to a value of a time-dependent variable representative of a variation in a change in the path on an abscissa axis,
    determine a setpoint state vector of a closed control loop of a path-control device, the closed control loop being configured to steer the vehicle so that the vehicle follows the path modeled by the Bézier curve, the vector being determined based on the lateral deviation, the time-dependent variable and the parameter,
    transmit the setpoint state vector as an input to the closed control loop, and
    steer the vehicle via the closed control loop so that the vehicle follows the path modeled by the Bézier curve.

* * * * *